(No Model.)
H. TESSEYMAN.
CAR TRUCK.
No. 598,258. Patented Feb. 1, 1898.
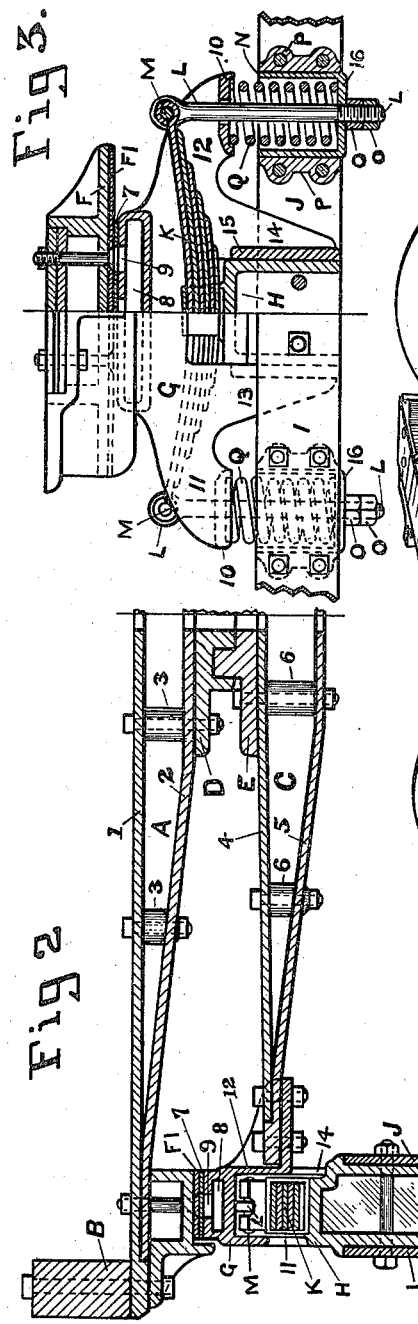
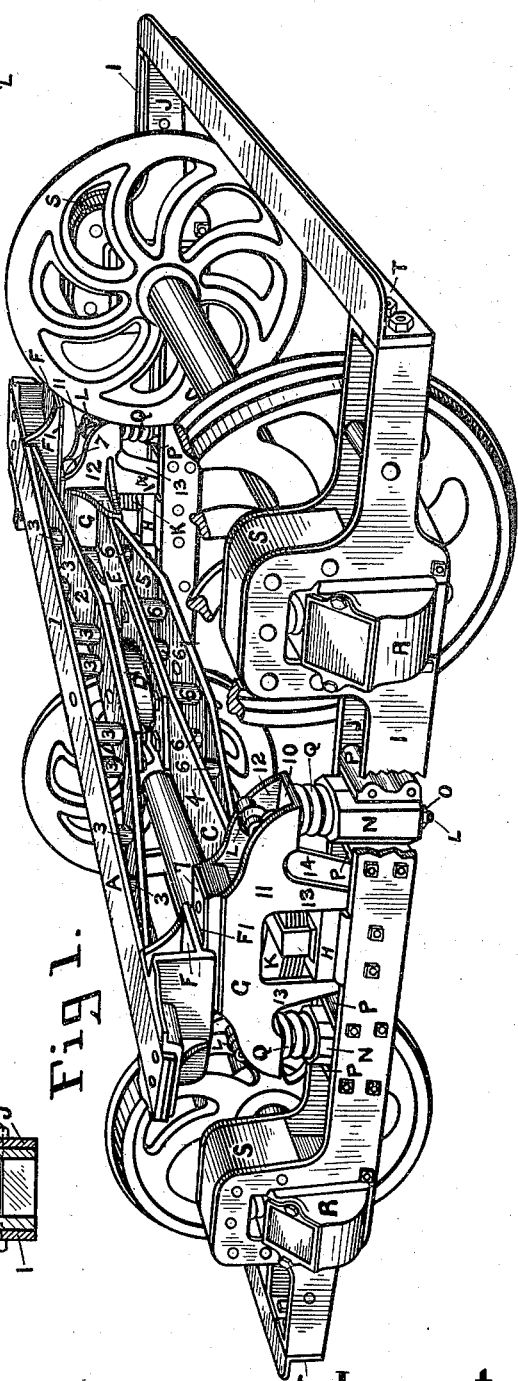
Attest:
E. B. Lehman
W. G. Mitchell
Inventor.
Henry Tesseyman

UNITED STATES PATENT OFFICE.

HENRY TESSEYMAN, OF DAYTON, OHIO, ASSIGNOR TO THE BARNEY & SMITH CAR COMPANY, OF SAME PLACE.

CAR-TRUCK.

SPECIFICATION forming part of Letters Patent No. 598,258, dated February 1, 1898.

Application filed August 24, 1897. Serial No. 649,317. (No model.)

*To all whom it may concern:*

Be it known that I, HENRY TESSEYMAN, a citizen of the United States, residing at Dayton, in the county of Montgomery and State of Ohio, have invented certain new and useful Improvements in Car-Trucks; and I do hereby declare that the following is a full, clear, and exact description of the invention.

My invention relates to trucks for railway-cars, and is especially applicable to electrically-propelled railway-cars of the double-truck class.

The invention has for its objects, first, to so construct such trucks as that the load will be equally distributed over each truck and carried uniformly by the side and center bearings, and thereby contribute an easy and uniform movement to the body of the car; second, to reduce the distance between the rails and the car-body; third, to provide means for adjusting the car-body on the trucks, and, fourth, to otherwise improve upon the construction of trucks of the class referred to, the objects named being accomplished by arrangement and combinations of parts such as are hereinafter fully described, pointed out in the claims, and illustrated in the accompanying drawings, which form a part of this specification, and in which—

Figure 1 is a perspective view of a truck embodying the invention, the body-bolster being shown out of line with the truck-transom; Fig. 2, an enlarged cross-section through the center of one-half of the truck, showing one of the side bearings, one-half of the center bearing, the side-bearing pedestal, the side bars, one of the longitudinal side sills of the car-body, and one of the half-elliptic springs mounted on its seat, the body-bolster being shown in line with the truck-transom; and Fig. 3, an enlarged side view of the central portion of the truck, one-half being shown in full elevation and one-half in section through the center of one of the side bearings, its adjacent pedestal, and through the center of the truck-frame, the body-bolster being shown in line with the truck-transom.

Similar letters and figures of reference indicate corresponding parts in each of the figures of the drawings.

In all other trucks with which I am familiar the normal load is carried wholly by either the center bearing or by the two side bearings, the usual custom being to leave a space between the body and truck side bearings to allow freedom of movement in the swaying to and fro of the car-body, so that in reality there are no side bearings at all until the car is sufficiently loaded to bring the bearings together or as they come in contact with each other alternately by the rocking of the car-body, and where trucks have been constructed to carry the normal load on the side bearings the so-called "center bearing" performs no function other than a mere pivotal connection between the truck and the car-body, while in the construction which I herein show and describe the weight is divided equally between the center and side bearings under all conditions of load, for the reason that the ends of the truck-transom are secured to the side bearings or to their adjacent pedestals, and the side and center bearings are bearings in fact, and in order to provide for swaying and lateral movement of the car-body and its truck connections I provide helical springs operative in movable pockets having seats for the lower ends of the springs, the upper ends of which bear against the under sides of side-bearing pedestal extensions, half-elliptic springs being mounted within the pedestals directly under the side bearings, the seats for the half-elliptic springs being secured to the truck-frame and the pedestals being provided with downward projections adapted to move freely between the side bars of the truck-frame.

A very essential consideration in the construction of electrically-propelled street-railway cars is the distance between the rails and the floor of the car, and much time, thought, and money have been devoted to the problem of lessening it. Therefore as my invention very considerably reduces the distance I consider this feature an important part thereof.

Another important feature of the invention is the means provided for adjusting the car-body to the trucks, whereby the body can at any time be adjusted to proper relation with the truck-springs and a uniform relation thereby maintained.

In the drawings, A represents the body-bolster, which for the purpose of illustrating my invention I have shown as consisting of upper and lower plates 1 2 and intermediate posts 3, joined together in the customary manner, and to which the sills B, Fig. 2, of the car-body are bolted.

C represents the truck-transom, which is also shown as consisting of two plates 4 5 and intermediate posts 6. A center bearing consisting of two parts D E, arranged in swivel-joint connection, is located between the body-bolster and the truck-transom, at the center thereof, and by which means the truck-bolster is permitted to rotate to accommodate itself to curvature in track and to otherwise at all times adjust itself to proper relation with the trucks. Side bearings F are secured to the under side of the body-bolster, at the ends thereof, and are provided with bearing-plates F'. A bifurcated pedestal G is secured to each end of the truck-transom and is provided at its top with a bearing-plate 7, beneath which is an oil-chamber 8, having openings 9, through which the chamber may be filled with oil and waste or other suitable material and by which means the bearings are kept lubricated. The pedestal is also provided with extensions 10, inner and outer walls 11 and 12, which form an open center for a purpose presently to be described, and inner and outer downward projections 13 and 14, having strengthening-walls 15, the whole being by preference cast in a single piece. A spring-seat H is mounted between and carried by inner and outer side bars I and J, which constitute the sides of the truck-frame. This spring-seat H, in conjunction with the side bars, forms a guide for the pedestal and carries a half-elliptic spring K, whose ends extend upwardly and outwardly between the walls 11 and 12 of the pedestal G. The projections 13 and 14 of the pedestal G extend downwardly between the side bars I and J, straddling the spring-seat H, as more clearly shown in Figs. 1 and 3, thus permitting the pedestal to move vertically between the side bars. The ends of the inner or long leaf of the springs K are curled to form bolt-holes and are also slotted to receive eyebolts L, which are pivotally connected with the spring by bolts or pins M, and whose free ends extend downwardly through holes in the extensions 10 of the pedestals and through the seats 16 of movable spring-pockets N, the said free ends being threaded to receive nuts O. The spring-pockets N are free to play vertically between guides P, secured to and between the side bars I and J. Helical springs Q, surrounding the eyebolts L, are carried in the movable spring-pockets N, and their upper ends bear against the under side of the extensions 10 of the pedestals G, while their lower ends rest on the spring-seats 16 of the movable spring-pockets N. It will thus be observed that the spring-pockets N and the helical springs Q, together with the eyebolts L, are free to move with the pedestal G between the side bars I and J with the movement of the half-elliptic spring K, which is of sufficient stiffness to carry the normal load without action. The helical springs Q, being weaker, are first acted upon, and as the load increases they are correspondingly compressed, and therefore offer increased resistance until spring K becomes active, after which the whole group act in unison. It will also be further observed that by raising or lowering the nuts O on the eyebolts L tension on the springs will be increased or decreased accordingly and the car-body will be correspondingly raised or lowered, and thereby convenient and complete adjustment may be obtained from time to time as occasion may require.

In practice the construction above described imparts a uniform easy motion to the car-body, distributes the weight of same equally over the side and center bearings, and reduces the distance between the car-body and the rails. The side bars of the truck-frame are bent to the shape of an inverted U at equal distances from the center line of the truck to accommodate journal-boxes R, which are of the usual construction and by which the weight of the truck-frame is carried on helical springs whose lower ends rest on the top sides of the journal-boxes and whose upper ends bear against the under sides of distance-castings S, which are secured to the side bars of the truck-frame, as clearly shown in Fig. 1. The side frames of the truck are united at their ends by end sills T in the usual manner.

In the foregoing description I have omitted reference to some of the minor details shown in the drawings and which have no particular connection with my invention, but the purpose of which will be clearly understood by those skilled in the art to which the invention belongs. I have also omitted from the drawings some appurtenances which are necessary to a complete truck, but none of which are essential to or have any particular connection with the improvements which I herein seek to protect by United States Letters Patent and which in structural detail may be varied without departing from the spirit of the invention, and I therefore do not limit the invention to the exact construction shown and described.

I claim—

1. In a car-truck, a truck-transom, a movable pedestal attached to each end thereof and having extensions which form bearings for the upper ends of helical springs carried in pockets movable between the side bars of the truck-frame, a body-bolster pivotally connected to said truck-transom at the center thereof and having a center bearing thereon, side bearings at the ends of said body-bolster, and bearing-plates below the same, said center and said side bearings being in constant contact with their respective bearing-plates, substantially as set forth.

2. In a car-truck, a truck-transom, a movable pedestal attached to each end thereof and having extensions which form bearings for the upper ends of helical springs carried in pockets movable between the side bars of the truck-frame, a body-bolster pivotally connected to said truck-transom at the center thereof and having a center bearing thereon, side bearings at the ends of said body-bolster and bearing-plates below the same, said center and said side bearings being in constant contact with their respective bearing-plates, and an oil-chamber formed in, or adjacent to the side bearings, whereby the same will be automatically lubricated, substantially as set forth.

3. In a car-truck, the combination of a truck-transom, a body-bolster pivotally connected therewith at the center thereof and forming a bearing thereon, side bearings at the ends thereof, movable pedestals secured to the ends of the truck-transoms and forming the lower of the side bearings, guides for said movable pedestals, half-elliptic springs partially inclosed by said pedestals and located under the side bearings of the truck-transom and having seats secured to and carried by the truck side frames, helical springs in pivotal relation with the free ends of said half-elliptic springs, bearings—formed by extensions of said movable pedestals—for the upper ends of said helical springs, movable pockets partially inclosing the latter and forming seats for the lower ends thereof, and guides formed in or adjacent to the truck side frames for said movable pockets.

4. In a car-truck, movable pedestals secured to the ends of the truck-transom and having extensions in line with the side frames of the truck and whose upper ends form bearings for the ends of a truck-bolster, guides formed on the side frames of the truck for controlling the movement of said pedestals, a rigid spring-seat located beneath each of the side bearings and carried by the side frames of the truck; each said spring-seat having a spring mounted thereon, said springs being in pivotal relation to and coöperating with other springs located beneath the said pedestal extensions and having their upper ends bearing against the under side thereof, pockets forming seats for the lower ends of said springs and guides for said pockets.

5. In a car-truck, a truck-frame consisting of side bars and end sills, journal-boxes operating in suitable recesses in the side bars, spring-seats carried by the side bars about midway between the journal-boxes, center springs mounted on said spring-seats, movable pedestals having extensions in line with the side-frames, a truck-transom having its ends secured to said movable pedestals, side bearings formed at the upper ends of said movable pedestals, and guides for controlling the movement of the latter, in combination with outer springs whose upper ends bear against the under sides of said extensions, pockets provided with seats for the lower ends of said outer springs, guides for said pockets, and means for connecting said springs and said pockets in coöperative relation with each other.

6. In a car-truck, the combination of a truck-frame consisting of side bars and end sills, a truck-transom, a pedestal secured to each end thereof and provided with a bearing, a body-bolster pivotally mounted on said truck-transom at the center thereof and provided with bearings coöperating with those of the pedestals, half-elliptic springs located beneath the pedestal-bearings and mounted on seats carried by the side frames, spring-pockets held in suspension from the free ends of said half-elliptic springs by suitable connecting mechanism, springs carried by said spring-pockets and whose upper ends bear against the under side of extensions of said pedestals, and guides in which said pedestals and said spring-pockets are movable.

7. In a car-truck, a truck-frame, a truck-transom, a pedestal secured to each end thereof and movable therewith, guides for controlling the movement of the pedestals, spring-seats carried by the side bars of the truck-frame in line with the truck-transom and having center springs mounted thereon, in combination with outer springs located equidistant from the center line of the center spring, movable spring-pockets carrying said outer springs and provided with seats for the lower ends thereof, pedestal extensions forming bearings for the upper ends of said outer springs, guides for the said movable spring-pockets, suitable mechanism for connecting said center and said outer springs, and a device for adjusting the relation of said springs with said pedestal and truck-transom.

8. For use in a car-truck, a half-elliptic spring mounted on a truck-frame between the journal-boxes therein, a helical spring pivotally suspended from each of the free ends of said half-elliptic spring, and suitable bearings for said helical springs, in combination with means for adjusting the tension on said springs.

9. In a car-truck, a truck-frame having its side bars provided with upwardly-extending recesses to receive journal-boxes, a truck-transom, a pedestal secured to each end of the same and movable therewith and having extensions in line with the side bars of the truck-frame, a body-bolster pivotally mounted on the truck-transom and having bearings coöperating with corresponding bearings on the upper ends of said pedestals, spring-seats carried by the side bars of the truck-frame about equidistant between the journal-bearings, half-elliptic springs mounted on said spring-seats and having their free ends extending upwardly, helical springs located below said free ends and whose upper ends bear against the under side of said pedestal extensions, movable spring-pockets carrying said helical springs and forming seats for the lower ends thereof, suitable guides for controlling the movements of said pedestals and said spring-pockets, and mechanism for adjustably connecting the said spring-pockets with the free ends of said half-elliptic springs, whereby the tension on the springs may be regulated and the car-body thereby adjusted at will.

10. In a car-truck, the combination of a truck-frame, a half-elliptic spring mounted thereon, between the journal-boxes therein, a helical spring suspended in pivotal relation with each of the free ends thereof, suitable bearings for said helical springs, means by which said springs are connected with a car-body, whereby the weight of the latter will be transmitted to and be carried by the springs, and a device for adjusting the tension of said springs whereby the car-body can be maintained in proper relation thereto.

11. In a car-truck, the combination of a truck-transom, a pedestal secured to each end thereof, bearing-surfaces at the upper end of said pedestals, a body-bolster pivotally mounted on said truck-transom and having a bearing at the center thereof, and a bearing at each end of said body-bolster, the said latter bearings being operative in conjunction with said bearing-plates.

Witness my hand to the foregoing specification on this 21st day of August, 1897.

HENRY TESSEYMAN.

In presence of—
E. L. LELAND,
N. EMMONS, Jr.